J. BRENZINGER.
ASSEMBLING AND FEEDING DEVICE FOR CAN HEADING MACHINES.
APPLICATION FILED JULY 14, 1917.

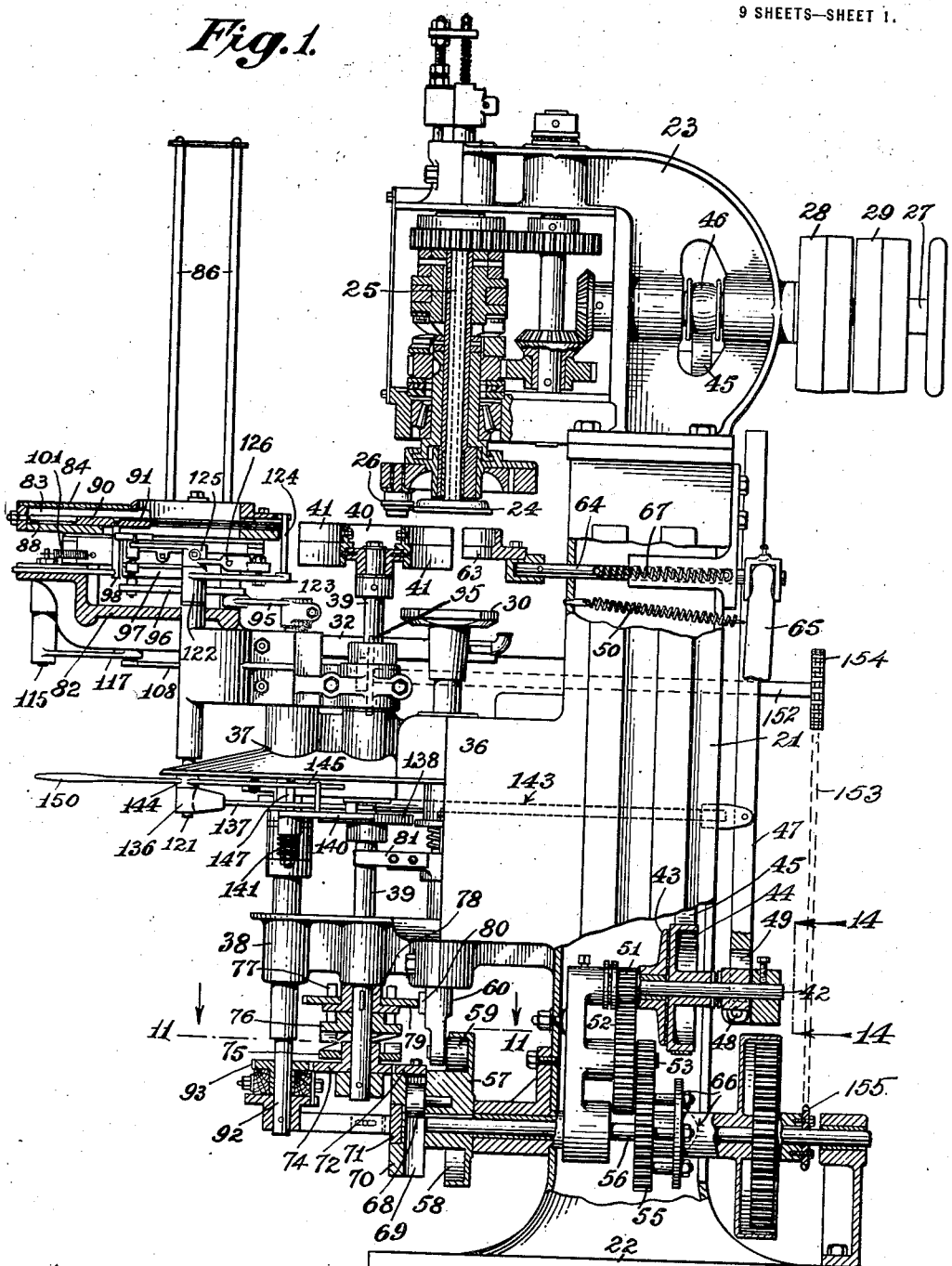

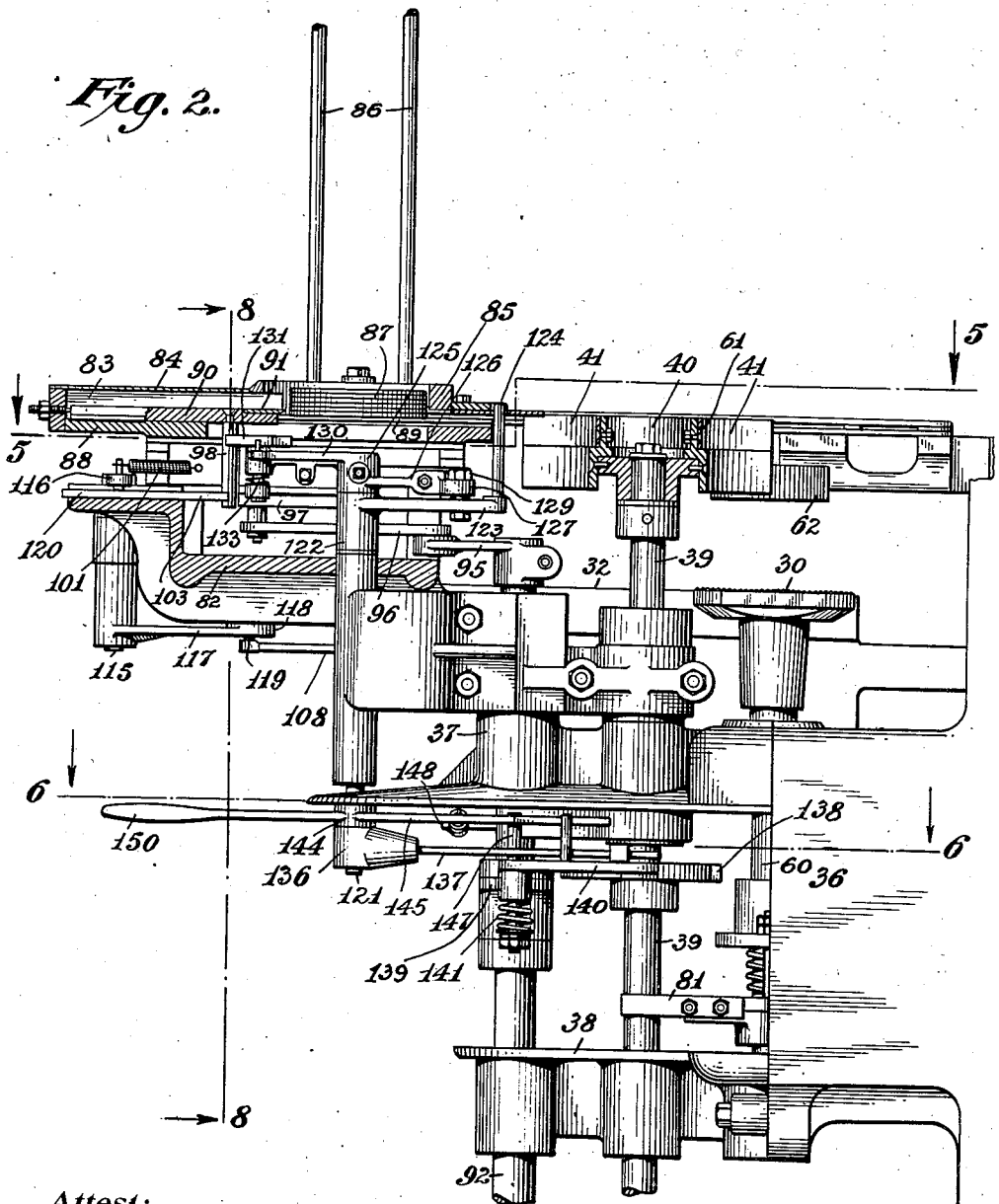

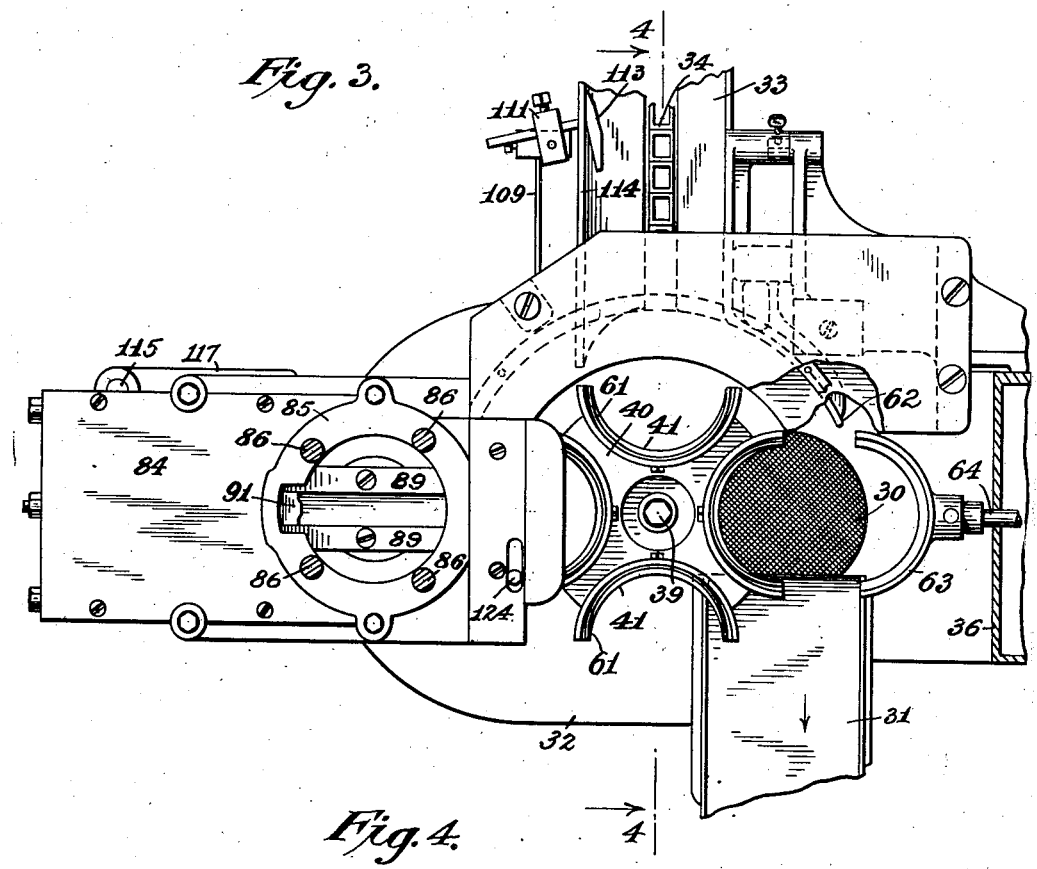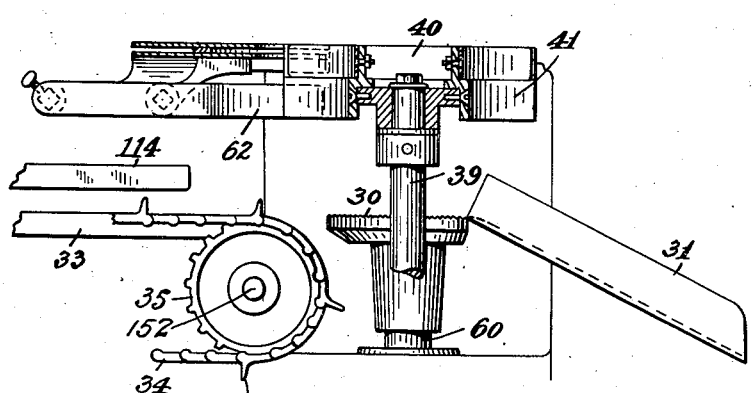

1,306,744.

Patented June 17, 1919.
9 SHEETS—SHEET 4.

Attest:

Inventor:

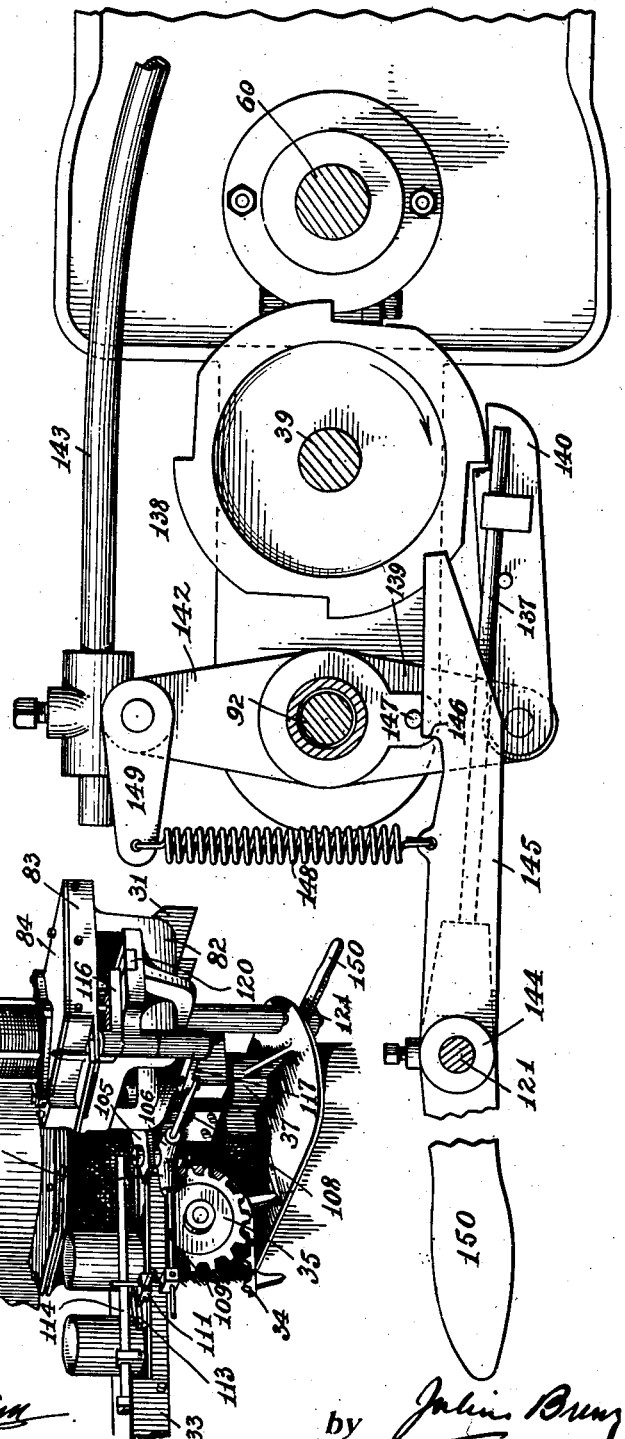

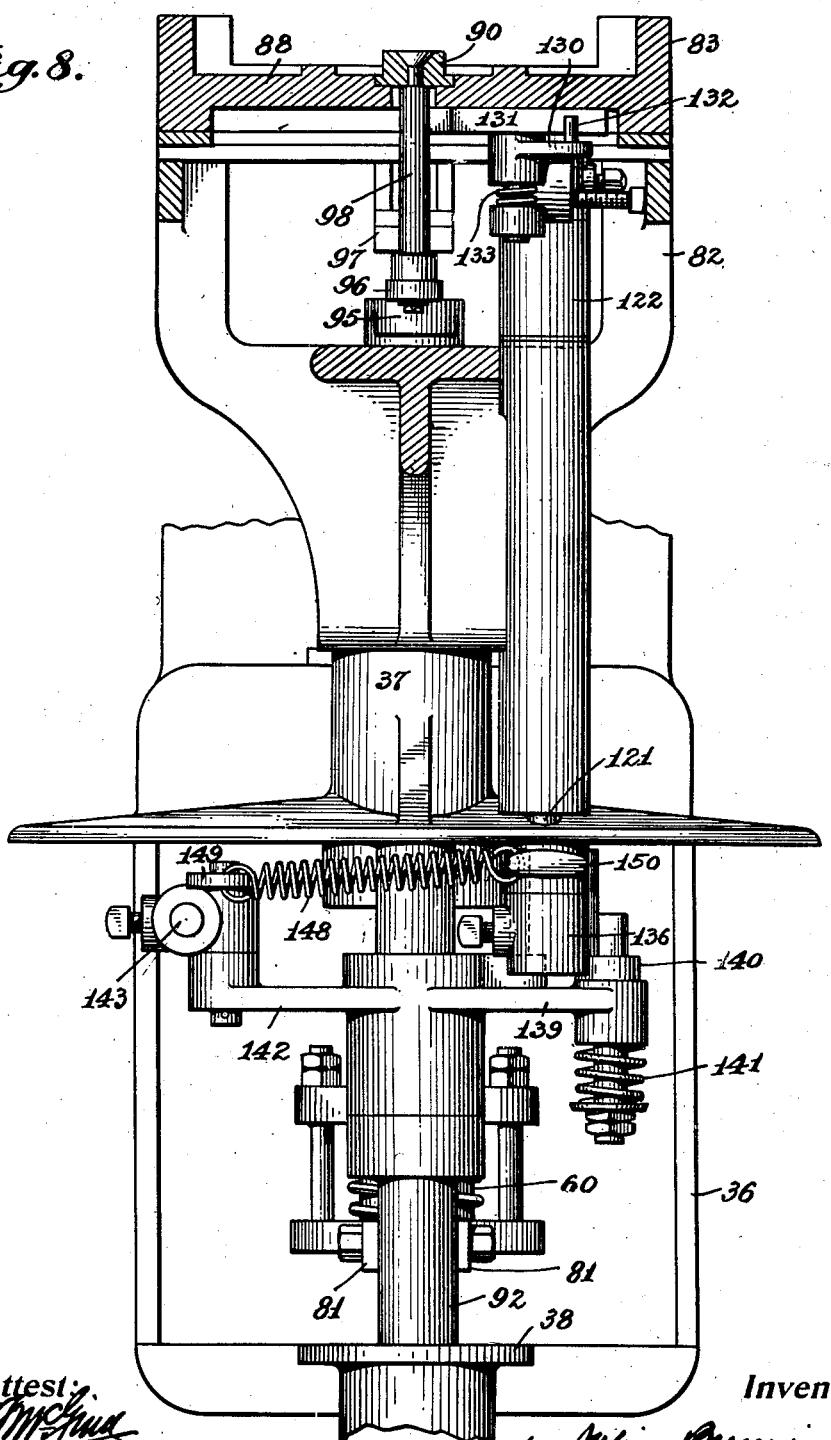

J. BRENZINGER.
ASSEMBLING AND FEEDING DEVICE FOR CAN HEADING MACHINES.
APPLICATION FILED JULY 14, 1917.
1,306,744.
Patented June 17, 1919.
9 SHEETS—SHEET 7.
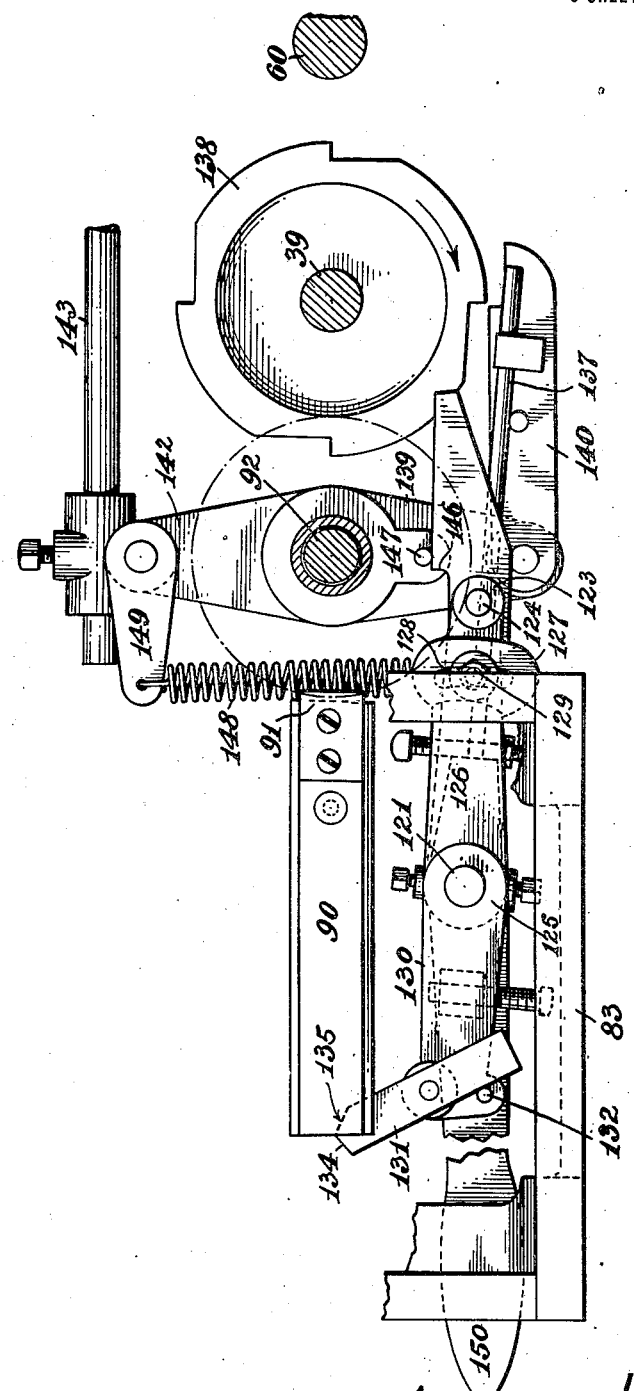
Attest:
Inventor:
by Julius Brenzinger
Atty.

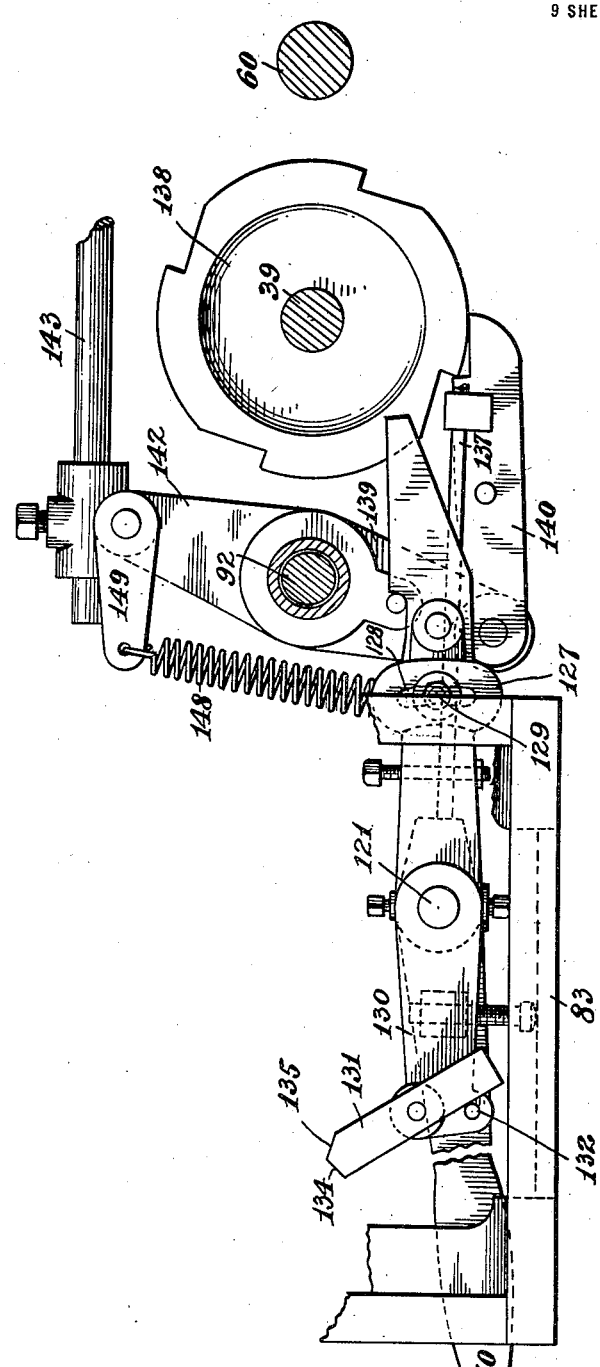

J. BRENZINGER.
ASSEMBLING AND FEEDING DEVICE FOR CAN HEADING MACHINES.
APPLICATION FILED JULY 14, 1917.

1,306,744.  Patented June 17, 1919.
9 SHEETS—SHEET 9.

Attest:
Inventor:
by
Atty.

UNITED STATES PATENT OFFICE.

JULIUS BRENZINGER, OF FAIRFIELD, CONNECTICUT, ASSIGNOR TO THE MAX AMS MACHINE COMPANY, OF BRIDGEPORT, CONNECTICUT, A CORPORATION OF NEW YORK.

ASSEMBLING AND FEEDING DEVICE FOR CAN-HEADING MACHINES.

1,306,744.                Specification of Letters Patent.      Patented June 17, 1919.

Application filed July 14, 1917. Serial No. 180,505.

*To all whom it may concern:*

Be it known that I, JULIUS BRENZINGER, a citizen of the United States, residing at Fairfield, in the county of Fairfield and State of Connecticut, have invented certain new and useful Improvements in Assembling and Feeding Devices for Can-Heading Machines, of which the following is a specification.

This invention relates generally to can heading machines, with more particular reference to accessory, adjunctive or appurtenant mechanisms for automatically advancing filled or packed open cans and the can tops or covers in succession and delivering the same in properly assembled condition for the heading operation in the seaming mechanism.

As is well known in what may be termed the can heading art, one of the more serious difficulties encountered in attempting to provide a device or devices for automatically assembling the unseamed can parts and delivering the same in assembled condition to the seaming mechanism of a heading machine, is that which is attributable to the fact that in the packaging of many kinds of perishable food products, particularly the larger fruits, it is almost invariably necessary to more or less over-fill the can in order to insure the desired weight or bulk of contents when the top or cover is pressed to position for seaming and retain the same in such position until hermetic sealing is effected, usually by the well-known double-seaming operation. In automatically assembling body and top when the can has been over-filled and then conveying the assembled parts to the seaming mechanism, it will be apparent, first, that it is by no means easy to perfectly adjust a cover on an over-filled can, and, second, that it is just as far from easy to retain the loose cover in proper adjustment during transit of can and cover to the seaming mechanism. It will be apparent that if the cans and covers are separately conveyed to the seaming mechanism, and assembly take place therein, where further movement of these parts prior to the seaming operation is in a vertical direction only, the difficulty to which I have referred will be minimized if not actually eliminated.

Furthermore, if feeding and assembling mechanism is desired which is entirely automatic in its operation, there are two features which may be said to be of the greatest importance. Such an inter-relationship should be established between the can feeding or advancing mechanism and the cover feeding or advancing mechanism that either thereof will automatically become inoperative upon inoperativeness of the other or if for any reason the other fails to perform its function. In other words, first, should the supply of covers become exhausted, and therefore no cover be in position for delivery to the can body next to be advanced, the can feeding or advancing mechanism should at once automatically become inoperative, in order to insure against the performance of a useless seaming operation on an open or uncovered can with probable spilling of the contents thereof and consequent waste, to say nothing of a manifestly objectionable besmearing of the machine parts; and, second, should no can be positioned in or on the conveying or advancing means for next succeeding delivery to the seaming mechanism, the cover delivering mechanism should at once automatically become inoperative, or operatively ineffective, so that no cover will be carried by itself into the seaming mechanism and be distorted to the point of clogging—and possibly even cause breakage of parts of—the machine. In short, the machine should operate on the principles of "no can, no cover", and "no cover, no can."

An important object of the present invention is the provision of an improved machine in which the can bodies and the tops or covers therefor are separately conveyed to the seaming mechanism, wherein they are properly assembled for successive seaming operations; but a still more important object of the invention is the establishment of the inter-relationship to which I have referred between the can advancing mechanism and the cover delivering mechanism, whereby no cover is delivered when a can body is not in position to receive the same, and no can body is advanced when a cover is not being delivered for superposition thereon. Incidental to the above, I have in view a machine of the character outlined which, considering the nature and extent of the work it is called upon to perform, is comparatively simple in construction, strong and durable, entirely automatic in action and thoroughly dependable in operation.

My invention will be more readily understood by reference to the accompanying drawing, forming a part of this specification, in which I have illustrated a practical and convenient embodiment thereof, and in which Figure 1 is a side elevation, partly in section, of a can heading machine equipped with appurtenant can and cover feeding and assembling mechanism which embodies my invention;

Fig. 2 is an enlarged side elevation, partly in section, of the cover-feed mechanism;

Fig. 3 is a top plan view of the same;

Fig. 4 is a transverse section, taken substantially on the line 4—4 of Fig. 3;

Fig. 6 is an enlarged horizontal section, taken substantially on the line 6—6 of Fig. 2;

Fig. 7 is a fragmentary perspective view of the machine, showing both can and cover feeding mechanisms and their inter-connecting elements;

Fig. 8 is an enlarged vertical section, taken substantially on the line 8—8 of Fig. 2;

Fig. 9 is a view similar to Fig. 6, but with parts in positions assumed when a cover has been pushed into the turret;

Fig. 10 is another view similar to Figs. 6 and 9, but with parts in positions assumed when no cover is delivered to the turret;

Figure 5:
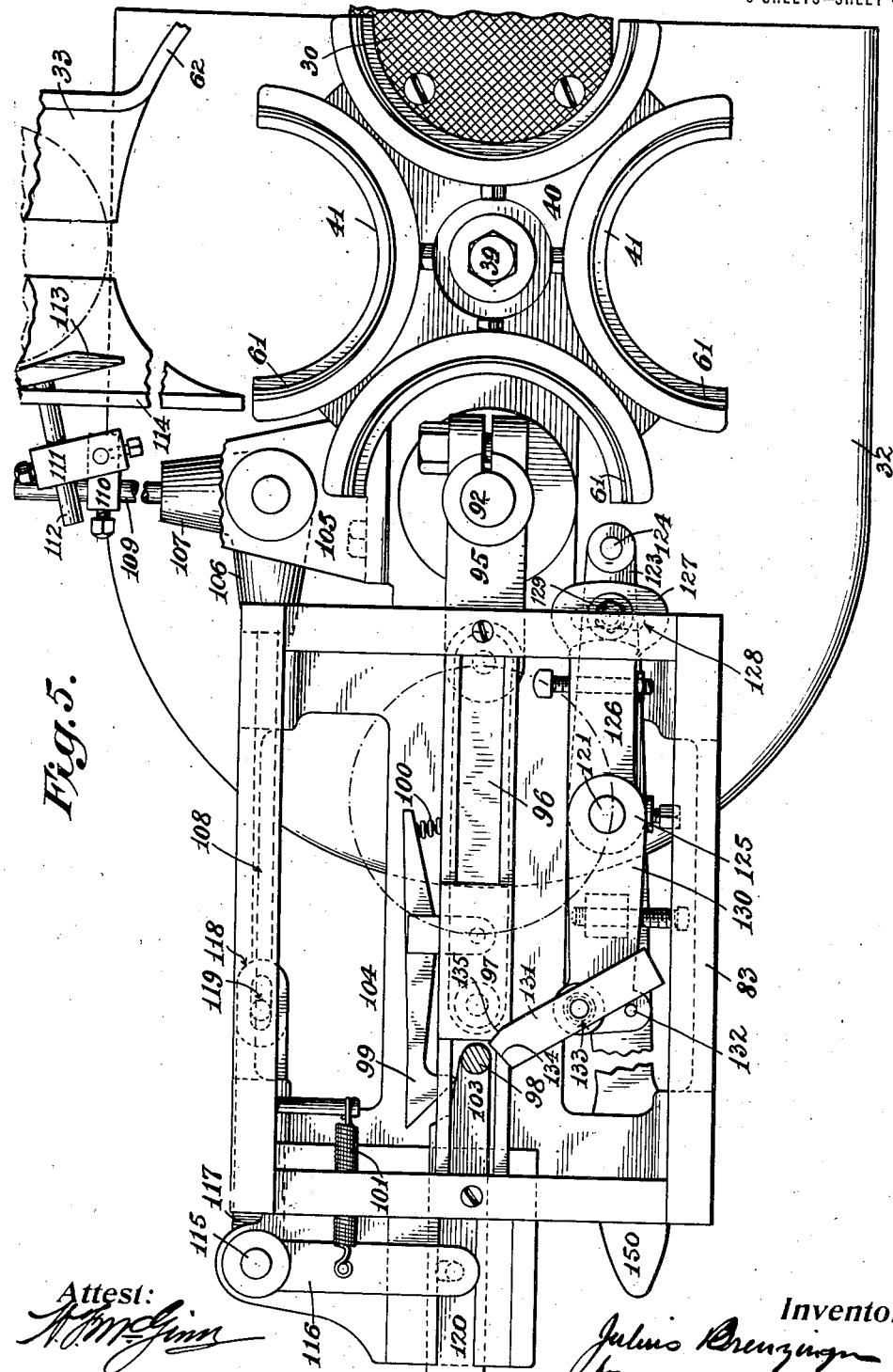
Fig. 5 is an enlarged horizontal section, taken substantially on the line 5—5 of Fig. 2, in which is shown a portion of the can-feed mechanism.

There are many different types of can heading or so-called "double seaming" machines, with any one of which the feeding and assembling device of the present invention might doubtless be successfully employed. For purposes of illustration and description, however, I have shown in Fig. 1 a well-known type of double seamer and one for use in connection with which my improved assembling and feeding device is particularly well adapted. This machine comprises the usual standard 21 with its heavy supporting base 22 and the overhang 23 from which the seaming mechanism is suspended. This seaming mechanism includes the chuck 24, adapted to enter the depression in the can top or cover and support the assembled parts against the centripetal forces of the seaming operation, which is mounted at the lower end of a vertically reciprocating rod or stem 25, and seaming rollers 26 mounted to be revolved around the chuck and be brought intermittently into effectively coöperative positional relation to the working or peripheral edge of said chuck to intercurl the superposed flanges on can body and cover in performing the well-known double seaming operation. The seaming mechanism is driven from the main driving shaft 27, suitably journaled in the vertical portion of the overhang 23, carrying the usual fast and loose pulleys 28 and 29 and connected in the usual manner with any suitable source of power. The specific means shown in Fig. 1 for operating the seaming rollers and chuck are clearly shown and described in detail by me in my prior Patents Nos. 1,167,346 and 1,167,347, both granted on January 4, 1916. It is also to be understood that I prefer that the seaming mechanism proper—that is to say, the seaming rollers and the chuck—be brought into effectively coöperating positional relationship only when a can body with its superposed cover is positioned in the seaming mechanism, and I have shown means for this purpose which is shown and described in detail in other patents, such as my Patent No. 1,167,349, and, more particularly, No. 1,167,351, both granted to me on January 4, 1916. For the purposes of this description, therefore, it will doubtless suffice to state that when a can body is delivered to proper position on the vertically reciprocable platform 30, with a top or cover positioned above the same, and said platform is raised to assemble can body and cover and clamp the same between said platform and the chuck 24, the can is "headed" in the usual manner and delivered upon the chute 31 for conveyance to such destination as may be desired.

As hereinbefore stated, the present invention has only to do with means for automatically successively delivering to and positioning in the seaming mechanism can bodies and covers, and in connection therewith the establishment of an inter-relationship between the can-feed and the cover-feed mechanisms that the operation of either thereof is dependent upon effective operation of the other.

There are undoubtedly a number of well-known ways of delivering can bodies to and positioning the same in the seaming mechanism. It may be assumed, however, as a general proposition, that all include a runway along which the open cans are progressively advanced to a mechanism or mechanisms which positively engage each can and position the same in the seaming mechanism. As a preferred means of carrying out my present invention, I provide a receiving table 32 upon which the can bodies are successively delivered from the run-way 33 by means of an endless chain 34 (Fig. 4) which is provided with fingers 151 151 adapted to engage the can bodies in a common and well-known manner and convey them to the table 32 successively and at the desired intervals. The chain 34 passes around and is driven by the sprocket 35 mounted on the shaft 152 and positioned to effect deliveries at the proper point. The shaft 152 is driven from the shaft 56 by means of the chain 153 passing around sprockets 154 and 155 on said shafts, respectively.

Mounted in the forwardly-projecting arm 36 of the standard 21 are the frames or brackets 37 and 38, suitably journaled in which is the vertical shaft 39 carrying at its upper end the turret 40. I have shown this turret provided with four substantially semi-circular recesses or pockets 41 41, equidistantly spaced apart and each of a size and configuration to receive and reasonably snugly contain a "round" can body of certain dimensions. The shaft 39 is intended to be intermittently rotated in the same direction through arcs of 90° each, and when in a condition of rest one of said recesses or pockets 41 is in position to receive a can body from the run-way 33 and another is positioned immediately above the vertically reciprocable platform 30 and therefore immediately below the chuck 24.

Suitably journaled in the lower part of the frame 21 is a shaft 42 upon which is mounted a clutch which comprises the usual fast and loose members 43 and 44, the latter being in the form of a pulley driven from the shaft 27 by means of a belt 45 passing around said pulley-member 44 and around a pulley 46 on the shaft 27. This clutch is operated by means of a lever 47, pivoted at 48 through a yoke 49 at the end thereof and adapted to be oscillated in the usual manner to frictionally engage and disengage the clutch members. The lever 47 is yieldingly held in clutch-engaging position by means of a spring 50.

Keyed on or otherwise suitably secured to the shaft 42 is a pinion 51 in mesh with a gear 52 on a short shaft 53, the latter carrying a pinion 54 in mesh with a gear 55 on the shaft 56 which is also suitably journaled in the lower part of the frame 21, and in this manner the shaft 56 is rotated. Keyed or otherwise suitably secured to the end of the shaft 56 is the cam-block 57, provided with an eccentric run-way 58 in which travels the roller 59 at the lower end of the vertically reciprocating rod or stem 60, at the upper end of which the platform 30 is mounted. It will be apparent that upon rotation of the cam-block 57 the rod or stem 60 will be vertically reciprocated to raise and lower the platform 30, and that the raising and lowering operations may be so timed as to effect the same each time the turret 40 has been brought to a condition of rest after movement thereof through an arc of 90° and having in this manner positioned a can body on said platform 30 with a top or cover positioned above the same in a manner which will be hereinafter described.

In each of the recesses or pockets 41 41 of the turret 40 I provide a substantially semi-circular spring or spring-clip 61 to yieldingly engage the can body delivered into said recess or pocket and retain the same therein while in transit to the platform 30, yet not interfere with the raising of the can body with said platform. A guide-strip 62 also serves to insure retention of the can body in the pocket 41, and immediately upon delivery of said body upon the platform 30, it is engaged by the semi-circularly recessed member 63, which is at the same time a positioning and a truing or "straightening" member, mounted at the end of the sliding rod 64 and adapted to yieldingly compress the upper end of the can body between what may be termed semi-circular dies with sufficient force to true or "straighten" the same, so that a perfect seam may be formed by the heading operation, but yieldingly, as stated, and with force insufficient to bind the can in starting upon its upward movement with the platform 30. The rod 64 is reciprocated by means of a lever 65, the upper end of which only is shown but which is pivoted intermediate its ends to the frame 21 and the lower end of which is oscillated by the cam member 66—the operating cam surface being shown in dotted lines. As this truing or "straightening" device forms no part of the present invention, the above abridged description of its construction and operation is thought to be sufficient, although it may be added that a tension spring 67 returns the rod and lever to initial positions after operation of said lever by the cam 66.

Figure 11:
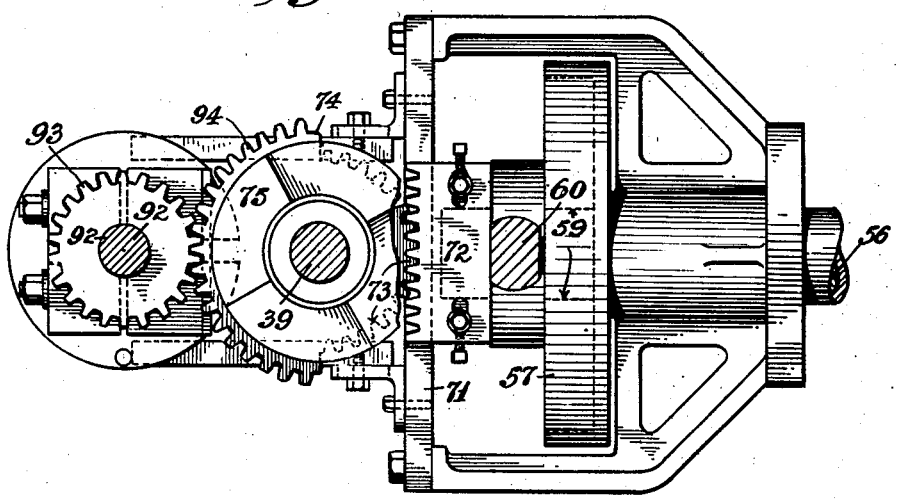
Fig. 11 is an enlarged horizontal section, taken substantially on the line 11—11 of Fig. 1, showing the driving mechanism for intermittently actuating the turret shaft and the cover-feed mechanism.
Figure 12:
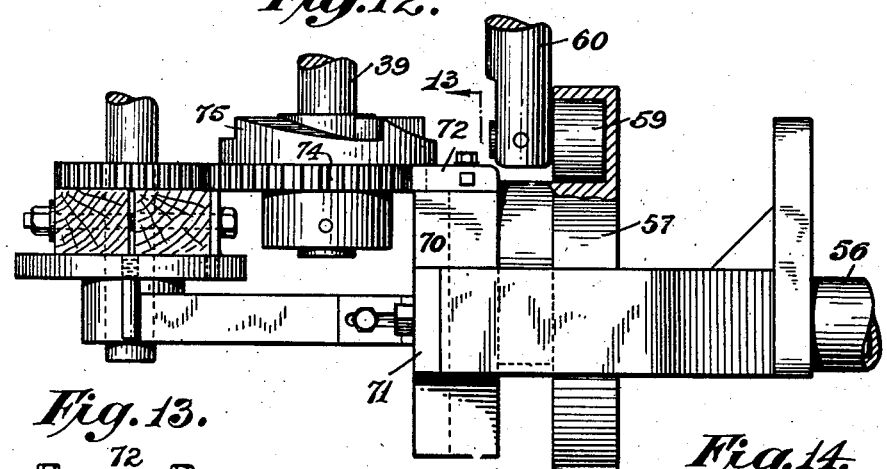
Fig. 12 is a side elevation of the parts shown in Fig. 11.
Figure 13:
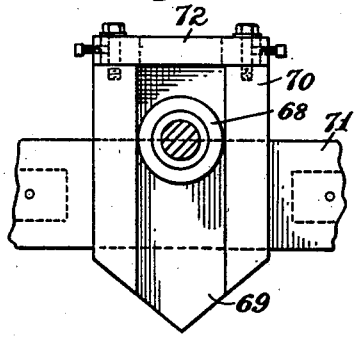
Fig. 13 is a detail section, taken substantially on the line 13—13 of Fig. 12.
Figure 14:
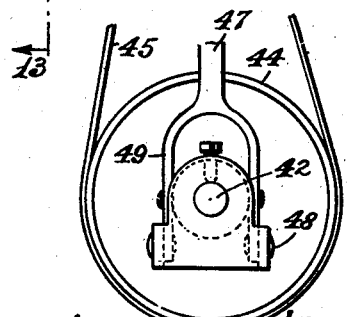
Fig. 14 is a detail end elevation of parts indicated on line 14—14 of Fig. 1.

The cam-block 57 also carries the roller 68 which projects into the guide- or run-way 69 in the block 70. This block 70 is also provided with a horizontal way within which fits the bar 71 along which said block is slidable. It will be apparent that upon rotation of the cam-block 57, the block 70 will be horizontally reciprocated. On the upper face of the block 70, I mount a rack 72 the teeth of which mesh with the teeth 73 (see dotted lines, Fig. 11) of what may be termed a double-sector gear 74 loose upon the shaft 39. It will be apparent, therefore, that reciprocation of the rack 72, in the manner described, will cause oscillation of the double-sector gear 74, and the pitch-circle of the teeth 73 is made such that the amplitude of this oscillation is exactly 90°.

I have shown mounted on the hub of this double-sector gear 74 the four-tooth clutch member 75, the teeth of which are adapted to engage the teeth of a corresponding and oppositely disposed clutch member 76 which has pins 77 77 projecting upwardly therefrom and through the flanged collar 78 keyed or otherwise suitably secured to the shaft 39. These pins 77 77 also project through a disk 79 mounted on the collar 78 and which is provided with four peripheral notches, equidistantly disposed and each adapted to receive a key 80 on the rod or stem 60. This key 80 is so positioned that when the stem 60 is elevated to raise the platform 30, it has passed into one of the peripheral notches in the disk 79 and holds the shaft 39 against rotation, releasing said shaft when the platform 30 is lowered after the seaming operation. The shaft 39 being yieldingly clamped between the braking leaf-springs 81 (Figs. 1, 2 and 8), it will be apparent that as the clutch member 75 is rotated in one direction by reciprocation of the rack 72, the shaft 39 will be rotated through an arc of 90°, rotating therewith the turret 40 and thereby carrying a can body to the platform 30, whereas upon rotation of the clutch member 75 in the other direction, upon the return stroke of the rack 72, the braking springs 81 will hold the shaft against rotation and the clutch member 76 will be raised to an extent sufficient to cause the teeth thereof to clear the teeth of the lower clutch member 75, which pass thereunder to positions for reëngagement therewith for further rotation of the shaft 39, at the proper time, through another arc of 90°.

Mounted upon and supported by the bracket 37 and the table 32 is the frame 82 which carries the elongated shallow casing 83. The upper plate 84 of this casing is provided with an orifice within which is mounted the ring 85 which is slightly greater in internal diameter than the tops or covers which are to be applied to the can bodies. The machine shown and being described is adapted for the heading of so-called "round" cans, and it will be understood that in connection with a machine for the heading of so-called "square" cans, or cans other than "round" in shape, the internal configuration of the ring 85 would correspond with the general shape or outline of the can head. In this ring 85 are mounted a plurality (preferably four) of posts or rods 86 86 so positioned as to retain in stacked or superposed arrangement a supply of can tops or covers 87 (Fig. 7). The lower plate 88 of the casing 83 is provided with a larger orifice—large enough to permit the free passage therethrough of a top or cover—bridging which are the bars 89 89 which support the stack 87 of covers.

Reciprocable within the casing 83, in a suitable runway, is the bar 90 which is provided with an edged plate 91 so positioned as to pass between the bottom cover of the stack 87 and the cover next above the same, the end of the bar 90 then engaging this bottom cover and in its forward movement sliding the same from underneath the pile or stack to supported position upon the substantially semi-cylindrical member of the turret 40 which forms a part of the receiving pocket for the can bodies, whereby, when said turret has been rotated through an arc of 90°, the cover is positioned above a can body which has just been delivered to said turret, and after further rotation of said turret through another arc of 90°, said cover is carried with the can body into the seaming mechanism in the manner heretofore described, the remainder of the stack of covers being supported upon the bar 90 during this advancing operation and dropping upon the supporting bars 89 89 after withdrawal of the bar 90 upon its return stroke of reciprocation.

This cover-feed mechanism is actuated from the shaft 92, suitably journaled in brackets 37 and 38, at the lower end of which is mounted the gear 93 the teeth of which are in mesh with the teeth 94 of the other segment of the double-sector gear 74 on the shaft 39, whereby the shaft 92 is oscillated upon oscillation of the double-sector gear 74 in the manner described. At the upper end of the shaft 92 is mounted the lever-arm 95 adapted through the connecting-rod 96 to reciprocate the frame or block 97 upon oscillation of said shaft 92. Depending from the bar 90 is the pin or post 98, and pivoted to the frame or block 97 is the hooked lever 99 yieldingly pressed to position to engage the pin 98 by the compression spring 100. In the absence of a body interposed to obstruct or prevent operation of the hook of the lever 99, it will be apparent that upon reciprocation of the frame or block 97 in one direction, the bar 90 will be advanced to feed a can cover to position on the turret 40, said bar being returned to initial position by means of the block 97 between which and the hook 99 the post 98 is held when being reciprocated.

As hereinbefore suggested, one of the principal features of the present invention is the provision of mechanism for preventing the feeding of a cover from the stack 87 thereof in the absence of a can body being delivered by the chain 34 from the run-way 33 to one of the recesses or pockets 41 of the turret 40. I therefore render the hooked-lever 99 inoperative in the absence of an advancing can body by providing a reciprocating member 103, slidable in a suitable guide-way in the frame or bracket 82, having its end recessed to receive the pin or post 98 and an inclined or beveled face 104 upon which travels the hook of the lever 99 when these parts are in the relative positions indicated in Fig. 5. It will be apparent that when the parts are in these positions, the engaging edge of the hook of the lever 99 will travel along the inclined or beveled face 104 of the member 103 and not engage the pin or post 98, in which case the bar 90 will not be reciprocated and no top or cover will be withdrawn from the stack.

In an arm 105, forming a part of or suitably secured to the frame of the machine, is pivoted a bell-crank lever comprising the arms 106 and 107 in which are socketed the arms or rods 108 and 109, respectively. To the rod 109 is secured the block 110, to which is pivoted the bar 111 secured on the rod 112 which projects into the run-way 33 and carries at the end thereof a head 113 in the path of movement of the advancing can bodies and adapted to be engaged thereby. The rod 112 passes between the guide-bar 114 of said run-way and the base thereof, and when the head 113 is engaged by an advancing can body, the bell-crank lever will be rocked in a direction to move the rod 108 in the direction of the hooked lever 99 (Fig. 5). Pivoted at 115 is another bell-crank lever which comprises the arms 116 and 117, the end of the latter being provided with a slotted head 118 in the slot of which is adapted to travel a pin or post 119 at the end of the rod 108. The end of the arm 116 of said lever is pivoted to an extension 120 of the reciprocating member 103, and it will therefore be apparent that upon outward movement of the rod 109, upon engagement of the head 113 on the rod 112 by an advancing can body, the arm 116 will be oscillated against the action of a spring 101, in tension between said arm and a pin in the frame, to withdraw the member 103 from the post 98 and thereby permit said post to be engaged by the hook of the lever 99. Therefore, when a can body is being advanced to the turret 40, the bell-crank levers will be actuated to permit engagement between the hook of the lever 99 and the post 98, and a top or cover will be fed to the can body being positioned, but unless a can body is being advanced, the member 103 will remain so positioned as to prevent engagement between said hook and said post, and in such case no top or cover will be delivered to the turret 40.

As is to be inferred from what I have hereinbefore stated, it is just as desirable that in case the supply of tops or covers in the stack 87 thereof becomes exhausted, and there is therefore no cover to be advanced, no can body be delivered to the turret 40 and thence to the seaming mechanism. To provide for this feature of operation, I mount in suitable bearings in the frame of the machine a vertical shaft 121 upon which is mounted the loose collar 122 carrying the arm 123 at the end of which is mounted the pin or post 124. This pin or post 124 is designed to be normally positioned in the path of movement of a can cover being advanced from the stack 87 to the turret 40, whereby it will be forced from such path by the passing top or cover and through such movement do certain work, as hereinafter described. Obviously, it must be returned to its initial position after the passage of each top or cover, and while a suitable spring might be interposed for this purpose, it will be apparent that in overcoming the resistance of this spring additional work would be imposed upon the pin or post and upon the passing can cover which actuates the same, and this additional resistance to the free movement of said top or cover might be sufficient to deflect final movement of the same and prevent its final proper positioning on the turret 40, or it might even result in a slight distortion of the metal of the cover, sufficient to prevent the formation of a perfect seam in the heading mechanism. I therefore mount at the upper end of the shaft 121 a collar 125, keyed or otherwise suitably secured to said shaft, from which projects an arm 126 having a head 127, said head being provided with a slot 128 in which is adjustably mounted the downwardly projecting pin 129 which is pivoted in the arm 123. Projecting in the other direction from the collar 125 is the arm 130, at the end of which is pivoted the pawl 131 and is provided a pin 132 which constitutes a stop against which said pawl is yieldingly held by means of a coil-spring 133 (Figs. 2 and 8). The opposite end of said pawl is provided with tapered or beveled faces 134 and 135, and this end is so positioned (as shown in Fig. 5) that it lies in the path of movement of the pin 98. When the pin 98 is advanced, in feeding a top or cover to the turret, it will engage the tapered face 134 of the pawl 131, and as this pawl is held by the pin 132 against oscillatory movement in this direction, the arm 130 will be rocked, thereby rocking the arm 136 which, in turn, correspondingly rocks the arm 123 to position the pin 124 thereon in the path of movement of the can cover being advanced. During this operation, the pin 98 will have cleared the end of the pawl 131, which is returned to its original or initial position upon movement of the pin 124 under action of the advancing top or cover. In its return movement, the pin 98 will again impinge against the end of the pawl 131, but as this end of said pawl is free to oscillate in this direction, it will be swung clear of the returning pin and restored to operative position under action of the spring 133. It will be seen, therefore, that as an advancing top or cover strikes the pin 124 and rocks the arm 123, the shaft 121 will be rocked.

At the lower end of the shaft 121 is keyed or otherwise suitably secured the collar 136 in which is mounted the projecting rod 137, and keyed or otherwise suitably secured to the turret shaft 39 is the four-tooth ratchet 138. Loosely mounted on the shaft 92 is a lever to the arm 139 of which is pivoted the pawl 140 yieldingly retained in position to engage a tooth in the ratchet 138 by means of the coil-spring 141. To the other arm 142 of this lever is secured the rod 143, the other end of which is secured to the clutch-operating lever 47, wherefore oscillation of the arm 142 in one direction will operate through the lever 47 to release the clutch 43—44 and thus terminate actuation of both body and cover feeding mechanisms, although the seaming mechanism, driven directly from the shaft 27, continues to idly revolve. It will now be seen that in case no cover is advanced by the feed-bar 90, the pin or post 124 at the end of the arm 123 will not be engaged and said arm will not be swung to rotate the shaft 121 and withdraw the pawl 140 to permit unimpeded and unobstructed rotation of the ratchet 138 and, consequently, of the turret shaft 39. If the supply of can covers in the stack 87 has become exhausted, and no cover can be advanced by the bar 90, obviously the pawl 140 will not be withdrawn, but will be engaged by a tooth of the ratchet 127, in which event the lever which comprises the arms 139 and 142 will be actuated to release all feeding mechanisms in the manner described, and no can will be fed to the turret 40.

As the clutch members 43 and 44 are held in engagement under action of the spring 50, it will be apparent that unless the lever which comprises the arms 139 and 142 is locked or checked in its "releasing" position the clutch will again and prematurely become effective, and on this account I loosely mount upon the shaft 121 a collar 144 projecting from which is the lever arm 145 which is provided with a recess or hook 146 near the end thereof adapted to receive and engage a pin 147 projecting upwardly from the lever arm 139. A spring 148, in tension between said arm 145 and an arm 149 carried at the end of the lever arm 142, effects yielding engagement between the hook 146 and the pin 147 when said arm 142 has been oscillated to release the clutch 43—44, so that both the can and cover feeding mechanisms are retained in released and inoperative conditions until manually released at the desired time through the swinging of the handle 150 with which the other end of the lever 145 is provided.

From the foregoing, it will be apparent that I have provided a device adapted to be made a part of certain types of can heading machines, in which both can bodies and can tops are automatically delivered to and assembled in the seaming mechanism, which, in the absence of a can body being delivered to and positioned in said seaming mechanism, will insure against the delivery of a can top or cover therefor, and which, furthermore, in the absence of a can top or cover being delivered for superposition upon a can body, will automatically check deliveries of can bodies.

Many modifications of minor details of my improved assembling and feeding devices for can heading machines will doubtless readily suggest themselves to those skilled in the art to which it appertains, and I therefore do not desire to limit my invention to the specific construction herein shown and described.

I claim as new and desire to secure by Letters Patent:

1. In a device of the character described, the combination, with intermittently actuated means for successively positioning open containers in the seaming mechanism of a heading machine, and means for delivering containers to said positioning means, said positioning means being also adapted to receive and retain a can head or cover immediately above each container delivered thereto, of means for successively delivering heads or covers to said positioning means, both of said delivering means operating when said positioning means is at rest, each container so delivered being placed in said positioning means underneath a head or cover delivered simultaneously with the last preceding container, and means for automatically checking effective operation of said head or cover delivering means in the absence of a container in said container delivering means to subsequently receive the head or cover which would otherwise be delivered.

2. In a device of the character described, the combination, with intermittently actuated means for successively positioning open containers in the seaming mechanism of a heading machine, and means for delivering containers to said positioning means, said positioning means being also adapted to receive and retain a can head or cover immediately above each container delivered thereto, of means for successively delivering heads or covers to said positioning means, both of said delivering means operating when said positioning means is at rest, each container so delivered being placed in said positioning means underneath a head or cover delivered simultaneously with the last preceding container, and means for automatically checking operation of said container delivering means in the absence of a head or cover in process of delivery to said positioning means.

3. In a device of the character described, the combination, with intermittently actuated means for successively positioning open containers in the seaming mechanism of a heading machine, and means for delivering containers to said positioning means, said positioning means being also adapted to receive and retain a can head or cover immediately above each container delivered thereto, of means for successively delivering heads or covers to said positioning means, both of said delivering means operating when said positioning means is at rest, each container so delivered being placed in said positioning means underneath a head or cover delivered simultaneously with the last preceding container, means for automatically checking effective operation of said head or cover delivering means in the absence of a container in said container delivering means to subsequently receive the head or cover which would otherwise be delivered, and means for automatically checking operation of said container delivering means in the absence of a head or cover in process of delivery to said positioning means.

4. In a device of the character described, the combination, with an intermittently actuated turret for successively positioning open containers in the seaming mechanism of a heading machine, and an endless conveyer for successively delivering containers to said turret in a rectilinear path and equidistantly disposed, said turret being also adapted to receive and retain a can head or cover immediately above each container delivered thereto, of means for successively delivering heads or covers to said turret, both of said delivering means operating when said turret is at rest, each container so delivered being placed in said turret underneath a head or cover delivered simultaneously with the last preceding container, and means for automatically checking effective operation of said head or cover delivering means in the absence of a container in said container delivering means to subsequently receive the head or cover which would otherwise be delivered.

5. In a device of the character described, the combination, with an intermittently actuated turret for successively positioning open containers in the seaming mechanism of a heading machine, and an endless conveyer for successively delivering containers to said turret in a rectilinear path and equidistantly disposed, said turret being also adapted to receive and retain a can head or cover immediately above each container delivered thereto, of means for successively delivering heads or covers to said turret, both of said delivering means operating when said turret is at rest, each container so delivered being placed in said turret underneath a head or cover delivered simultaneously with the last preceding container, and means for automatically checking operation of said container delivering means in the absence of a head or cover in process of delivery to said turret.

6. In a device of the character described, the combination, with an intermittently actuated turret for successively positioning open containers in the seaming mechanism of a heading machine, and an endless conveyer for successively delivering containers to said turret in a rectilinear path and equidistantly disposed, said turret being also adapted to receive and retain a can head or cover immediately above each container delivered thereto, of means for successively delivering heads or covers to said turret, both of said delivering means operating when said turret is at rest, each container so delivered being placed in said turret underneath a head or cover delivered simultaneously with the last preceding container, means for automatically checking effective operation of said head or cover delivering means in the absence of a container in said container delivering means to subsequently receive the head or cover which would otherwise be delivered.

7. In a device of the character described, the combination, with the seaming mechanism of a can heading machine, said mechanism including seaming rollers and means for raising the can to be headed to position for effective operation of said rollers, means for processionally advancing open-ended can bodies to said raising means, and means for automatically delivering can heads or covers to position for superposition on said can bodies successively during movement of the latter in said raising means, of means for checking operation of said advancing means in the absence of a head or cover in said delivering means.

8. In a device of the character described, the combination, with the seaming mechanism of a can heading machine, said mechanism including seaming rollers and means for raising the can to be headed to position for effective operation of said rollers, means for processionally advancing open-ended can bodies to said raising means, and means for automatically delivering can heads or covers to position for superposition on said can bodies successively during movement of the latter in said raising means, of means for automatically checking operation of said cover delivering means in the absence of a can body in said advancing means to receive the cover which would otherwise be delivered, and means for automatically checking operation of said advancing means in the absence of a head or cover in said delivering means.

9. In a device of the character described, the combination, with the seaming mechanism of a can heading machine, said mechanism including seaming rollers and means for raising the can to be headed to position for effective operation of said rollers, means for successively advancing can bodies to and positioning the same in said raising means, said advancing means also operating to receive and advance can heads or covers successively and position each thereof for reception by a can body during movement of the latter in said raising means, means for successively delivering can bodies to said advancing and positioning means, and means for successively delivering can heads or covers to said advancing and positioning means, of means automatically checking operation of said can-body-delivering means in the absence of a head or cover in said cover delivering means.

10. In a device of the character described, the combination, with the seaming mechanism of a can heading machine, said mechanism including seaming rollers and means for raising the can to be headed to position for effective operation of said rollers, means for successively advancing can bodies to and positioning the same in said raising means, said advancing means also operating to receive and advance can heads or covers successively and position each thereof for reception by a can body during movement of the latter in said raising means, means for successively delivering can bodies to said advancing and positioning means, and means for successively delivering can heads or covers to said advancing and positioning means, of means for automatically preventing the advancement and positioning of a head or cover in the absence of a can body in said delivering means to receive the cover which would otherwise be advanced, and means for automatically checking operation of said can-body-delivering means in the absence of a head or cover in said cover delivering means.

11. In a device of the character described, the combination, with the seaming mechanism of a can heading machine, said mechanism including seaming rollers and means for raising the can to be headed to position for effective operation of said rollers, intermittently actuated means for successively advancing open containers to and positioning the same in said raising means, said means being also adapted to successively receive and advance can heads or covers and position each thereof for reception by a container during movement thereof in said raising means, means for successively delivering containers to said advancing and positioning means, and means automatically actuated when said advancing and positioning means are at rest for delivering a head or cover to said advancing and positioning means, of means for automatically checking operation of said container delivering means in the absence of a head or cover in said cover delivering means.

12. In a device of the character described, the combination, with the seaming mechanism of a can heading machine, said mechanism including seaming rollers and means for raising the can to be headed to position for effective operation of said rollers, intermittently actuated means for successively advancing open containers to and positioning the same in said raising means, said means being also adapted to successively receive and advance can heads or covers and position each thereof for reception by a container during movement thereof in said raising means, means for successively delivering containers to said advancing and positioning means, and means automatically actuated when said advancing and positioning means are at rest for delivering a head or cover to said advancing and positioning means, of means for checking effective operation of said cover delivering means in the absence of a container in process of delivery to said advancing and positioning means to receive such cover, and means for automatically checking operation of said container delivering means in the absence of a head or cover in said cover delivering means.

13. In a device of the character described, the combination, with the seaming mechanism of a can heading machine, said mechanism including seaming rollers and means for raising the can to be headed to position for effective operation of said rollers, intermittently actuated means for successively positioning open containers in said raising means, continuously actuated means for successively delivering containers to said positioning means, said positioning means being also adapted to receive and advance a head or cover to position for reception by each container in turn during movement thereof in said raising means, and intermittently actuated means for successively delivering heads or covers to said positioning means, of means for automatically checking operation of said container delivering means in the absence of a head or cover in said cover delivering means.

14. In a device of the character described, the combination, with the seaming mechanism of a can heading machine, said mechanism including seaming rollers and means for raising the can to be headed to position for effective operation of said rollers, intermittently actuated means for successively positioning open containers in said raising means, continuously actuated means for successively delivering containers to said positioning means, said positioning means being also adapted to receive and advance a head or cover to position for reception by each container in turn during movement thereof in said raising means, and intermittently actuated means for successively delivering heads or covers to said positioning means, of means for automatically preventing the reception and advancement of a head or cover in the absence of a container in said delivering means to receive the same, and means for automatically checking operation of said container delivering means in the absence of a head or cover in said cover delivering means.

15. In a device of the character described, the combination, with the seaming mechanism of a can heading machine, said mechanism including seaming rollers and means for raising the can to be headed to position for effective operation of said rollers, intermittently actuated means for successively positioning can bodies in said raising means, continuously actuated means for successively delivering containers to said positioning means, said positioning means being also adapted to receive and advance a head or cover to position for reception by each container in turn during movement thereof in said raising means, and intermittently actuated means for successively delivering heads or covers to said positioning means while the latter is at rest, of means for automatically checking operation of said container delivering means in the absence of a head or cover in said cover delivering means.

16. In a device of the character described, the combination, with the seaming mechanism of a can heading machine, said mechanism including seaming rollers and means for raising the can to be headed to position for effective operation of said rollers, intermittently actuated means for successively positioning can bodies in said raising means, continuously actuated means for successively delivering containers to said positioning means, said positioning means being also adapted to receive and advance a head or cover to position for reception by each container in turn during movement thereof in said raising means, and intermittently actuated means for successively delivering heads or covers to said positioning means while the latter is at rest, of means for automatically checking operation of said container delivering means in the absence of a head or cover in said cover delivering means, and means for checking operation of said cover delivering means in the absence of a container in said container delivering means to receive a cover.

17. In a device of the character described, the combination, with the seaming mechanism of a can heading machine, said mechanism including seaming rollers and means for raising the can to be headed to position for effective operation of said rollers, an intermittently rotating turret for successively positioning can bodies in said raising means, a continuously operating endless conveyer for successively delivering can bodies to said turret, said turret being also adapted to receive and advance a head or cover to position for reception by each container in turn during movement of the latter in said raising means, and a reciprocating pusher for successively delivering heads or covers to said turret, of means for automatically checking movement of said conveyer in the absence of a head or cover in process of delivery by said pusher.

18. In a device of the character described, the combination, with the seaming mechanism of a can heading machine, said mechanism including seaming rollers and means for raising the can to be headed to position for effective operation of said rollers, an intermittently rotating turret for successively positioning can bodies in said raising means, a continuously operating endless conveyer for successively delivering can bodies to said turret, said turret being also adapted to receive and advance a head or cover to position for reception by each can body in turn during movement of the latter in said raising means, and a reciprocating pusher for successively delivering heads or covers to said turret, of means for automatically preventing the reception and advancement of a head or cover in the absence of a can body in said conveyer which would otherwise receive said cover, and means for automatically checking movement of said conveyer in the absence of a head or cover in process of delivery by said pusher.

19. In a device of the character described, the combination, with the seaming mechanism of a can heading machine, said mechanism including seaming rollers and means for raising the can to be headed to position for effective operation of said rollers, an intermittently rotating turret for successively positioning can bodies in said raising means, a continuously operating endless conveyer for successively delivering containers to said turret, said turret being also adapted to receive and advance a head or cover to position for reception by each container in turn during movement thereof in said raising means, and reciprocating means for successively delivering heads or covers to said positioning means while the latter is at rest, of means for automatically checking movement of said conveyer in the absence of a head or cover in said cover delivering means.

20. In a device of the character described, the combination, with the seaming mechanism of a can heading machine, said mechanism including seaming rollers and means for raising the can to be headed to position for effective operation of said rollers, an intermittently rotating turret for successively positioning can bodies in said raising means, a continuously operating endless conveyer for successively delivering containers to said turret, said turret being also adapted to receive and advance a head or cover to position for reception by each container in turn during movement of said conveyer in said raising means, and reciprocating means for successively delivering heads or covers to said turret while the latter is at rest, of means for automatically checking movement of said conveyer in the absence of a head or cover in said cover delivering means, and means for checking operation of said cover delivering means in the absence of a can body in said conveyer which would otherwise receive said cover.

21. In a device of the character described, the combination, with the seaming mechanism of a can heading machine, said mechanism including seaming rollers and means for raising the can to be headed to position for effective operation of said rollers, and means for delivering can bodies to and positioning the same successively in said raising means, of means for retaining in stacked arrangement a plurality of heads or covers, means for successively withdrawing the bottom cover of the stack and advancing the same to position for reception by a delivered can body during movement thereof in said raising means, and means for automatically checking operation of said can-body-delivering means in the absence of a head or cover in said withdrawing and advancing means.

22. In a device of the character described, the combination, with the seaming mechanism of a can heading machine, said mechanism including seaming rollers and means for raising the can to be headed to position for effective operation of said rollers, and means for delivering can bodies to and positioning the same successively in said raising means, of means for retaining in stacked arrangement a plurality of heads or covers, means for withdrawing successively the bottom cover of the stack and advancing the same to position for reception by a delivered can body during movement of the latter in said raising means, means for automatically checking operation of said cover withdrawing and advancing means in the absence of a can body in said delivering means, and means for automatically checking operation of said can-body-delivering means in the absence of a head or cover in said withdrawing and advancing means.

23. In a device of the character described, the combination, with the seaming mechanism of a can heading machine, said mechanism including seaming rollers and means for raising the can to be headed to position for effective operation of said rollers, an intermittently rotating turret for successively positioning can bodies in said raising means, an endless conveyer for successively delivering can bodies to said turret, and means for retaining in stacked arrangement a plurality of heads or covers, of means for withdrawing the bottom cover of the stack and positioning the same in said turret for advancement to position for reception by a positioned can body during movement of the latter, in said raising means, and means for checking movement of said conveyer in the absence of a head or cover in said withdrawing and positioning means.

24. In a device of the character described, the combination, with the seaming mechanism of a can heading machine, said mechanism including seaming rollers and means for raising the can to be headed to position for effective operation of said rollers, an intermittently rotating turret for successively positioning can bodies in said raising means, an endless conveyer for successively delivering can bodies to said turret, means for retaining in stacked arrangement a plurality of heads or covers, and means for withdrawing the bottom cover of the stack and positioning the same in said turret for advancement to position for reception by a positioned can body during movement of the latter in said raising means, of means for automatically checking operation of said cover withdrawing and positioning means in the absence of a can body in process of delivery to said turret, and means for automatically checking movement of said conveyer in the absence of a head or cover in said withdrawing and positioning means.

25. In a device of the character described, the combination, with means for raising a can body to position in the seaming mechanism of a heading machine, and means for interposing a head or cover between said can body and said seaming mechanism whereby said head or cover will be received by and positioned on said can body as the latter is raised for the seaming operation, of means for successively delivering can bodies to said raising means, means for checking operation of said delivering means in the absence of a head or cover in process of interposition, and means for preventing the interpositioning of a head or cover in the absence of a can body in process of delivery to said raising means.

26. In a device of the character described, the combination, with the seaming mechanism of a can heading machine, said mechanism including seaming rollers and means for raising the can to be headed to position for effective operation of said rollers, means for advancing open-ended can bodies successively to position in said raising means, means for delivering a head or cover to position for reception by each can body in turn during movement thereof in said raising means, and means for actuating said can-body-advancing means, of means normally operable to disconnect said actuating means upon operation of said cover delivering means, and means actuated by a head or cover in process of delivery to render said disconnecting means inoperative.

27. In a device of the character described, the combination, with the seaming mechanism of a can heading machine, said mechanism including seaming rollers and means for raising the can to be headed to position for effective operation of said rollers, means for successively positioning can bodies in said raising means, means for successively delivering said can bodies to said positioning means, means for advancing a head or cover to position for reception by each can body in turn during movement thereof in said raising means, and means for actuating said delivering means, of means normally operable to disconnect said actuating means upon operation of said positioning means, and means actuated by an advancing head or cover to render said disconnecting means inoperable.

28. In a device of the character described, the combination, with an intermittently rotating turret coöperating with a vertically reciprocating platform to successively position can bodies in the seaming mechanism of a heading machine, means for successively delivering can bodies to said turret, said turret also operating to receive and advance a head or cover to position for reception by each can body in turn when the latter is raised by said platform, and means for successively delivering heads or covers to said turret, of means for checking operation of said can-body-delivering means in the absence of a head or cover in said cover delivering means.

29. In a device of the character described, the combination, with an intermittently rotating turret coöperating with a vertically reciprocating platform to successively position can bodies in the seaming mechanism of a heading machine, means for successively delivering can bodies to said turret, said turret also operating to receive and advance a head or cover to position for reception by each can body in turn when the latter is raised by said platform, and means for successively delivering heads or covers to said turret, of means for automatically preventing the reception of a head or cover by said turret in the absence of a can body in said delivering means to receive the cover which would otherwise be advanced, and means for automatically checking operation of said can-body-delivering means in the absence of a head or cover in said cover delivering means.

30. In a device of the character described, the combination, with an intermittently rotating turret coöperating with a vertically reciprocating platform to successively position can bodies in the seaming mechanism of a heading machine, means for successively delivering can bodies to said turret, said turret also operating to receive a head or cover and advance the same to position for reception by each can body in turn during vertical movement of the latter on said platform, means for successively delivering heads or covers to said turret, and means for actuating said can-body delivering means, of means normally operable to disconnect said actuating means upon rotation of said turret, and means actuated by a head or cover in process of delivery to said turret to render said disconnecting means inoperable.

31. In a device of the character described, the combination, with the seaming mechanism of a can heading machine, said mechanism including seaming rollers and means for raising the can to be headed to position for effective operation of said rollers, an intermittently rotating turret for successively positioning can bodies in said raising means, means for successively delivering can bodies to said turret, said turret also operating to receive and advance a head or cover to position for reception by each can body in turn during movement thereof in said raising means, means for successively delivering heads or covers to said turret, and means for actuating said can-body delivering means, of means normally operable to disconnect said actuating means upon rotation of said turret, and means actuated by a head or cover in process of delivery to said turret to render said disconnecting means inoperable.

32. In a device of the character described, the combination, with an intermittently rotating turret coöperating with a vertically reciprocating turret to successively position can bodies in the seaming mechanism of a heading machine, an endless conveyer for successively delivering can bodies to said turret in a rectilinear path and equidistantly disposed, said turret also operating to receive and advance a head or cover to position for reception by each can body in turn during vertical movement of the latter on said platform, means for successively delivering heads or covers to said turret, and means for actuating said conveyer, of means normally operable to disconnect said conveyer actuating means upon rotation of said turret, and means actuated by a head or cover in process of delivery to said turret to render said disconnecting means inoperable.

33. In a device of the character described, the combination, with the seaming mechanism of a can heading machine, said mechanism including seaming rollers and means for raising the can to be headed to position for effective operation of said rollers, an intermittently rotating turret for successively positioning can bodies in said raising means, an endless conveyer for successively delivering can bodies to said turret in a rectilinear path and equidistantly disposed, said turret also operating to receive and advance a head or cover to position for reception by each can body in turn during movement of the latter in said raising means, intermittently actuated means for successively delivering heads or covers to said turret, and means for actuating said conveyer, of means normally operable to disconnect said conveyer actuating means upon rotation of said turret, and means actuated by a head or cover in process of delivery to said turret to render said disconnecting means inoperable.

34. In a device of the character described, the combination, with the seaming mechanism of a can heading machine, said mechanism including seaming rollers and means for raising the can to be headed to position for effective operation of said rollers, means for successively positioning can bodies in said raising means, means for successively delivering can bodies to said positioning means, means for retaining in stacked arrangement a plurality of heads or covers, means for withdrawing the bottom cover of the stack and advancing the same to position for reception by a positioned container during movement of the latter in said raising means, and means for actuating said can body delivering means, of means normally operable to disconnect said actuating means upon operation of said positioning means, and means actuated by an advancing head or cover to render said disconnecting means inoperable.

35. In a device of the character described, the combination, with the seaming mechanism of a can heading machine, said mechanism including seaming rollers and means for raising the can to be headed to position for effective operation of said rollers, means for successively positioning can bodies in said raising means, means for successively delivering can bodies to said positioning means, means for retaining in stacked arrangement a plurality of heads or covers, means for withdrawing the bottom cover of the stack and advancing the same to position for reception by a positioned container during movement of the latter in said raising means, and means for actuating said can-body-delivering means, of means normally operable to disconnect said actuating means upon operation of said positioning means, and means actuated by an advancing head or cover to render said disconnecting means inoperable.

36. In a device of the character described, the combination, with the seaming mechanism of a can heading machine, said mechanism including seaming rollers and means for raising the can to be headed to position for effective operation of said rollers, means for successively positioning can bodies in said raising means, means for successively delivering can bodies to said positioning means, normally inoperative means for advancing a head or cover to position for reception by each can body in turn during movement of the latter in said raising means, and means for actuating said can-body-delivering means, of means normally operable to disconnect said actuating means upon operation of said positioning means, means actuated by an advancing head or cover to render said disconnecting means inoperable, and means actuated by each can body being delivered to said positioning means to render said cover advancing means contemporaneously operative.

37. In a device of the character described, the combination, with the seaming mechanism of a can heading machine, said mechanism including seaming rollers and means for raising the can to be headed to position for effective operation of said rollers, an intermittently rotating turret for successively positioning can bodies in said raising means, means for successively delivering can bodies to said turret, normally inoperative means for advancing a head or cover to position on said turret for reception by each can body in turn during movement of the latter in said raising means, and means for actuating said delivering means, of means normally operable to disconnect said actuating means upon rotation of said turret, means actuated by an advancing head or cover to render said disconnecting means inoperable, and means actuated by each can body being delivered to said turret to render said cover advancing means contemporaneously operative.

38. In a device of the character described, the combination, with the seaming mechanism of a can heading machine, said mechanism including seaming rollers and means for raising the can to be headed to position for effective operation of said rollers, an intermittently rotating turret for successively positioning can bodies in said raising means, an endless conveyer for delivering can bodies successively to said turret in a rectilinear path and equidistantly disposed, normally inoperative means for advancing a head or cover to position on said turret for reception by each can body in turn during movement of the latter in said raising means, and means for actuating said conveyer, of means normally operable to disconnect said actuating means upon rotation of said turret, means actuated by an advancing head or cover to render said disconnecting means inoperable, and means actuated by each can body being delivered to said turret to render said cover advancing means contemporaneously operative.

39. In a device of the character described, the combination, with the seaming mechanism of a can heading machine, said mechanism including seaming rollers and means for raising the can to be headed to position for effective operation of said rollers, means for successively positioning can bodies in said raising means, means for successively delivering can bodies to said positioning means, means for retaining in stacked arrangement a plurality of heads or covers, normally inoperative means for withdrawing the bottom cover of the stack and advancing the same to position for reception by a can body during movement of the latter in said raising means, and means for actuating said can-body-delivering means, of means normally operable to disconnect said actuating means upon operation of said positioning means, means actuated by an advancing head or cover to render said disconnecting means inoperable, and means actuated by each can body being delivered to said positioning means to render said cover advancing means contemporaneously operative.

40. In a device of the character described, the combination, with intermittently actuated means coöperating with a vertically reciprocating platform to successively position can bodies in the seaming mechanism of a heading machine, said means being also adapted to successively receive and advance can heads or covers and position each thereof for reception by a positioned container during vertical movement of the latter on said platform, and means for successively delivering covers to said positioning means, said cover delivering means including a reciprocable pusher and a reciprocating actuating member provided with means for engaging said pusher, of means normally adapted to prevent such engagement, and mechanism controlled by each advancing can body in turn to render said last-mentioned means inoperable.

41. In a device of the character described, the combination, with an intermittently rotating turret coöperating with a vertically reciprocating platform to successively position open containers in the seaming mechanism of a heading machine, an endless conveyer for successively delivering containers to said turret, said turret being also adapted to receive and advance a head or cover to position for reception by each container in turn during vertical movement of the latter on said platform, and means for successively delivering heads or covers to said turret, said cover delivering means including a reciprocable pusher and a reciprocating actuating member provided with means for engaging said pusher, of means normally adapted to prevent such engagement, and mechanism controlled by each advancing container in turn to render said last-mentioned means inoperable.

42. In a device of the character described, the combination, with means coöperating with a vertically reciprocating platform to position open containers in succession in the seaming mechanism of a heading machine, means for retaining in stacked arrangement a plurality of heads or covers, means for withdrawing the bottom cover of the stack and advancing the same to position for reception by a positioned container during vertical movement of the latter on said platform, said cover withdrawing and advancing means including a reciprocable pusher and a reciprocating actuating member provided with means for engaging said pusher, of means normally adapted to prevent such engagement, and mechanism controlled by each advancing container in turn to render said last-mentioned means inoperable.

43. In a device of the character described, the combination, with an intermittently rotating turret coöperating with a vertically reciprocating platform to successively position open containers in the seaming mechanism of a heading machine, an endless conveyer for successively delivering containers to said turret, said turret being also adapted to receive and advance a head or cover to position for reception by each container in turn during vertical movement of the latter on said platform, means for retaining in stacked arrangement a plurality of heads or covers, means for withdrawing the bottom cover of the stack and advancing the same to said turret, said cover withdrawing and advancing means including a reciprocable pusher and a reciprocating actuating member provided with means for engaging said pusher, of means normally adapted to prevent such engagement, and mechanism controlled by each advancing container in turn to render said last-mentioned means inoperable.

44. In a device of the character described, the combination, with a vertically reciprocating platform adapted to raise a container to the seaming mechanism of a heading machine, an intermittently rotating shaft having mounted thereon means for successively positioning open containers on said platform, means for successively delivering said containers to said positioning means, said positioning means being also adapted to receive and advance a head or cover to position for reception by each positioned container during vertical movement of the latter on said platform, means for successively delivering heads or covers to said positioning means, a driving member common to all of said elements, and a clutch interposed in the common driving connection, of a ratchet on said shaft, means operable to release said clutch, means normally positioned to be engaged by a tooth in said ratchet upon each intermittent movement thereof and operate said clutch-releasing means, and means adapted to be actuated by an advancing cover to withdraw said ratchet-tooth engaging means.

45. In a device of the character described, the combination, with means for raising a container to the seaming mechanism of a heading machine, an intermittently rotating shaft having mounted thereon means for successively positioning open containers in said raising means, means for successively delivering said containers to said positioning means, said positioning means being also adapted to receive and advance a head or cover to position for reception by each positioned container during movement of the latter in said raising means, means for successively delivering heads or covers to said positioning means, said cover delivering means including a reciprocating pusher, a driving member common to all of said elements, and a clutch interposed in the common driving connection, or a ratchet on said shaft, means operable to release said clutch, means normally positioned to be engaged by a tooth in said ratchet upon each intermittent movement thereof and operate said clutch-releasing means, means adapted to be actuated by an advancing cover to withdraw said ratchet-tooth engaging means, and means adapted to be actuated by the return stroke of said pusher to restore said ratchet-tooth engaging means to engaging position.

46. In a device of the character described, the combination, with means for raising a container to the seaming mechanism of a heading machine, an intermittently rotating shaft having mounted thereon means for successively positioning open containers in said raising means, means for successively delivering said containers to said positioning means, said positioning means being also adapted to receive and advance a head or cover to position for reception by each positioned container during movement of the latter in said raising means, means for successively delivering heads or covers to said positioning means, a driving member common to all of said elements, and a clutch interposed in the common driving connection, of a ratchet on said shaft, means operable to release said clutch, means normally positioned to be engaged by a tooth of said ratchet upon each intermittent movement thereof and operate said clutch-releasing means, means adapted to be actuated by an advancing cover to withdraw said ratchet-tooth engaging means, and means for checking said clutch-releasing means in releasing position upon each operation thereof.

47. In a device of the character described, the combination, with means for raising a container to the seaming mechanism of a heading machine, an intermittently rotating shaft having mounted thereon means for successively positioning open containers in said raising means, means for successively delivering said containers to said positioning means, said positioning means being also adapted to receive and advance a head or cover to position for reception by each container in turn during movement of the latter in said raising means, means for successively delivering heads or covers to said positioning means, said cover delivering means including a reciprocable pusher and a reciprocating actuating member provided with means for engaging said pusher, means normally adapted to prevent such engagement, and mechanism controlled by each advancing container in turn to render said last-mentioned means inoperable, of a driving member common to all of said elements, a clutch interposed in the common driving connection, a ratchet on said shaft, means operable to release said clutch, means normally positioned to be engaged by a tooth in said ratchet upon each intermittent movement thereof and operate said clutch releasing means, and means adapted to be actuated by an advancing head or cover to withdraw said ratchet-tooth engaging means.

48. In a device of the character described, the combination, with means for raising a container to the seaming mechanism of a heading machine, an intermittently rotating shaft having mounted thereon means for successively positioning open containers in said raising means, means for successively delivering said containers to said positioning means, said positioning means being also adapted to receive and advance a head or cover to position for reception by each container in turn during movement of the latter in said raising means, means for successively delivering heads or covers to said positioning means, said cover delivering means including a reciprocable pusher and a reciprocating actuating member provided with means for engaging said pusher, means normally adapted to prevent such engagement, and mechanism controlled by each advancing container in turn to render said last-mentioned means inoperable, of a driving member common to all of said elements, a clutch interposed in the common driving connection, a ratchet on said shaft, means operable to release said clutch, means normally positioned to be engaged by a tooth in said ratchet upon each intermittent movement thereof and operate said clutch releasing means, means adapted to be actuated by an advancing head or cover to withdraw said ratchet-tooth engaging means, and means adapted to be actuated by said pusher upon its return stroke to restore said ratchet-tooth engaging means to engaging position.

In testimony of the foregoing, I have hereunto set my hand in the presence of two witnesses.

JULIUS BRENZINGER.

Witnesses:
C. D. TRUBENBACH,
GEORGE GEHRUNG.